Oct. 12, 1948.　　　　E. V. GARNETT　　　　2,451,284
AUTOMOBILE TRANSPORTING TRUCK
Filed March 10, 1947　　　　　　　　　　　　2 Sheets-Sheet 1
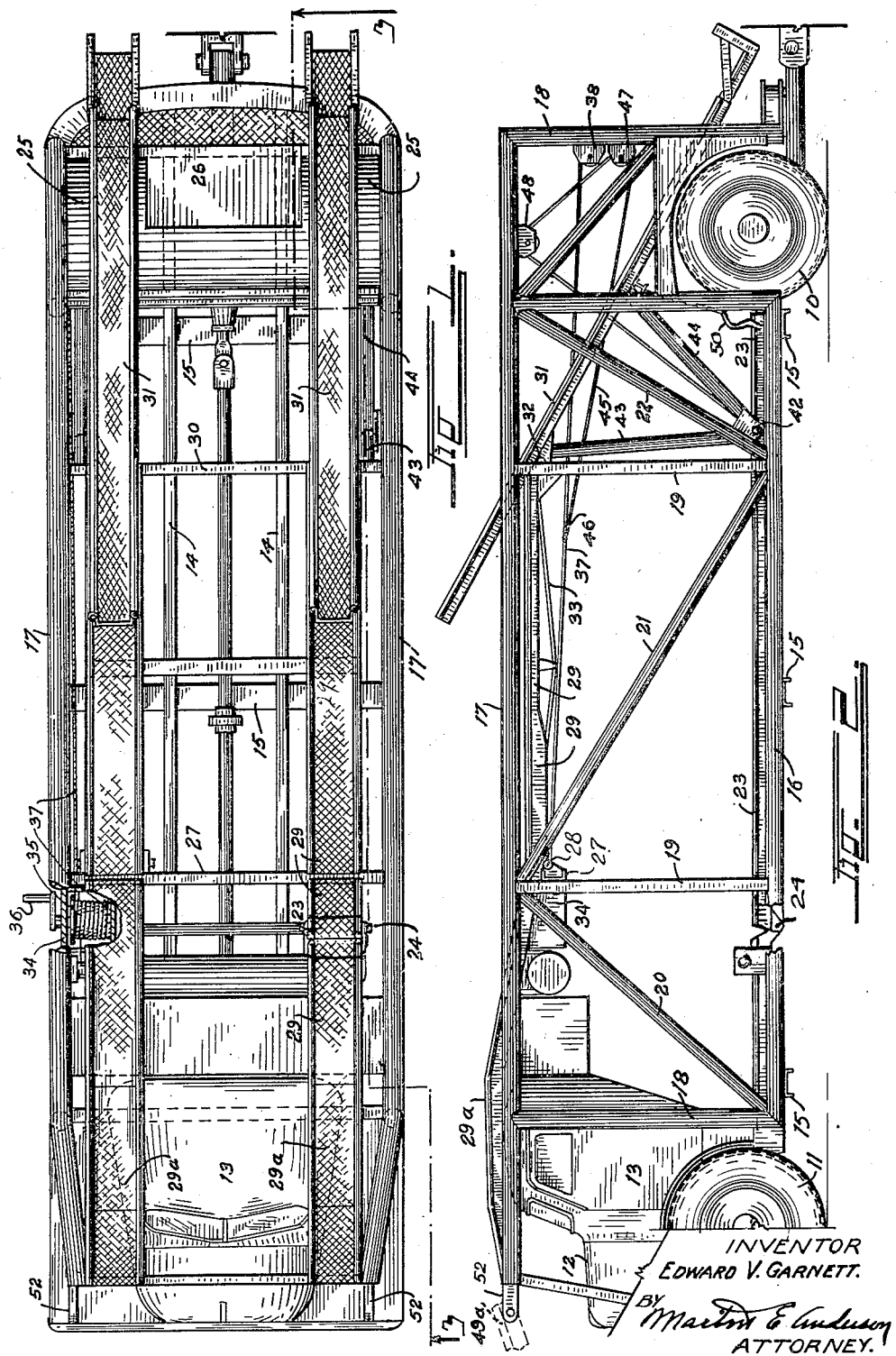
INVENTOR
EDWARD V. GARNETT.
BY
ATTORNEY.

Oct. 12, 1948. E. V. GARNETT 2,451,284
AUTOMOBILE TRANSPORTING TRUCK
Filed March 10, 1947 2 Sheets-Sheet 2
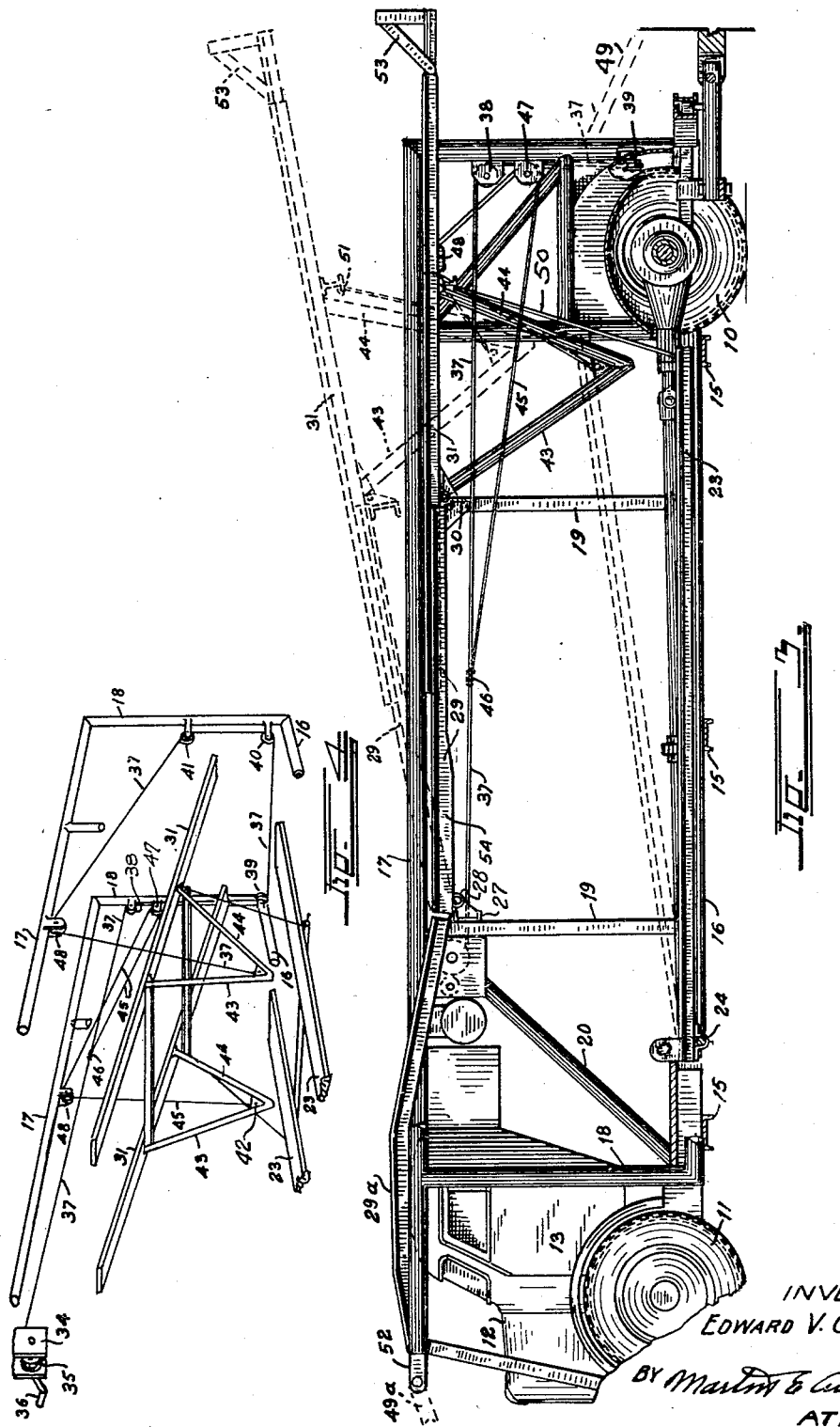
INVENTOR.
EDWARD V. GARNETT.
BY
ATTORNEY.

Patented Oct. 12, 1948

2,451,284

UNITED STATES PATENT OFFICE 2,451,284

AUTOMOBILE TRANSPORTING TRUCK

Edward V. Garnett, Denver, Colo.

Application March 10, 1947, Serial No. 733,534

6 Claims. (Cl. 296—1)

1

This invention relates to improvements in automobile transporting trucks and has reference to an improved construction of the truck shown and described in my pending application Serial No. 686,749, filed July 27, 1946.

It is now quite customary to transport automobiles from the factory to the agencies throughout the country by means of trucks, instead of sending them by freight.

It is well known that many specifically different trucks have been designed as patented for use in transporting automobiles; however, this invention relates to specific improvements of such trucks. In order to make the business of transporting automobiles commercially profitable, it is necessary to transport at least four, and if possible, five automobiles. It is evident that it costs substantially the same to transport four automobiles, as it would cost to transport five. In order to transport five automobiles on a truck and a trailer that comply with the State laws relating to maximum length, height and width, it has been found to be necessary to transport three automobiles on the tractor truck and two on the trailer.

In my copending application above identified, a construction is shown and described which makes it possible to transport three automobiles.

This invention relates to an improved construction which has for its object to facilitate the loading and the unloading of automobiles.

In order to describe the invention so that it may be readily understood, reference will now be had to the accompanying drawings in which the invention has been illustrated, and in which:

Figure 1 is a top plan view of the truck, parts being broken away to better disclose the construction;

Figure 2 is a side elevation of the truck, parts being broken away to better disclose the construction;

Figure 3 is a side elevation similar to that shown in Figure 2, but in which the position of the wheel ramps during the time an automobile is being loaded on the lowermost supporting frame of the truck is shown; and Figure 4 is a diagrammatic representation showing the arrangement of cables employed for operating the wheel ramps during the loading and unloading operation.

In the drawing reference numeral 10 designates the rear driving wheels and reference numerals 11 the front steering wheels, the engine and associated parts are positioned under the hood 12 and the operating mechanism is in

2 the cab 13. Since this invention does not relate to any of the parts just enumerated, those parts of the truck have merely been shown in outline. The chassis frame has two side members 14 that are most clearly shown in Figure 1 and extending across the side members are channels 15, three having been shown in the drawing; however, as many transverse channels may be used as are found desirable. Supported on the transverse channels or beams 15 is a frame work comprising tubular side members 16 that rest directly on the channels and are secured to them by welding or in any other suitable way. A similar frame is positioned above the lower frame and comprises side members 17 that are connected with the lower frame members by end posts 18 and a plurality of intermediate frame members 19 which may be of any suitable structure, of either channel iron or gas pipe construction. Suitable braces like those designated by reference numerals 20, 21, and 22 are provided wherever necessary. Two wheel ramps 23 have their front ends pivoted at points 24 so that they may be moved upwardly about the pivots to the dotted line position shown in Figure 3. When in their lowermost position these ramps occupy the position shown in Figure 2 and rest on the upper surfaces of the channels 15. The rear wheels are covered by fenders 25 and in between the fenders is a plate 26 that covers the rear axle. The wheel ramps 23 extend rearwardly into close proximity with the front wall of the fenders as shown in Figure 2.

Extending across the frame and connected with the upper ends of beams 19 is a channel bar 27 having pivots 28 that form supports for the first ends of wheel ramps 29. These wheel ramps extend rearwardly and are connected to a transversely extending channel 30 that also supports movable wheel ramps 31 that are connected with the channel 30 for pivotation by means of pivot pins 32. Wheel ramps 29 are provided with strengthening trusses 33. The movable wheel ramps 31, when in the position shown in Figure 2, rest on the upper surface of the fenders in a manner shown in Figure 2.

A winch that has been indicated in its entirety by reference numeral 34, is carried by the frame on the upper side when viewed as in Figure 1 and this is provided with a cable drum 35. A crank 36 serves to rotate the cable drum which, in the usual manner, is provided with a pawl and ratchet mechanism that prevents reverse movement. Cable 37 is connected with the winch drum and extends rearwardly to the end of the frame where it passes over a pulley 38 and thence downwardly about pulley 39, thence across the frame and under pulley 40, thence upwardly and over pulley 41, thence over pulley 40 and downwardly, the end being connected to the vertex 42 of a triangle comprising the two side members 43 and 44 which are connected to and extend downwardly from the wheel ramps 31. Cable 37 has a branch cable 45 connected with it at point 46 and this extends rearwardly to pulley 47, thence upwardly and over pulley 48, thence downwardly to the vertex 42 of the triangle connecting with the movable ramp 31 on the other side of the frame.

Referring now to Figures 2 and 4, it will be seen that when the winch is operated to wind the cable on the drum, the triangles, together with ramps 31 will move upwardly from the full line to the broken line position shown in Figure 3. The maximum elevated position being that indicated by broken lines. When the wheel ramps 23 and 29 are to be lowered, this can be done and the lowering controlled by the winch in a manner quite obvious.

When the truck, which has been shown in the drawing and described above, is to be loaded, the wheel ramps are moved upwardly into the dotted line position shown in Figure 3. Inclined ramps like those designated by reference numeral 49 are positioned between the ground and the fenders 25 as indicated by broken lines in Figure 3. An automobile is then pulled upwardly along ramps 49 and onto the wheel ramps 23. The elevated position of ramps 29 and 31 permits an automobile to pass over the fenders and onto ramps 23. After the automobile has been brought into position on ramps 23, the two ramps are lowered by means of the winch to the full line position. At this point attention is called to cables 50 that connect the rear ends of ramps 23 with points 51 on ramps 31. These cables are of such length that they permit ramps 31 to turn upwardly into the position shown by full lines in Figure 3 without lifting the lower ramps 23, and therefore after an automobile has been loaded onto the lower ramps, it can be lowered to its final transporting position while ramps 31 are still in a horizontal position. With the parts in the position shown in Figure 3, other ramps like those designated by reference numeral 49a may be connected to pivots 52, after which an automobile may be driven upwardly onto ramps 29a. This automobile is then moved rearwardly until its wheels engage the stops 53. After the automobile has been positioned on wheel ramps 31 and tied down by suitable tie mechanisms, ramps 31 may be lowered into the position shown in Figure 2. A third automobile may now be backed up onto ramps 29a and moved rearwardly until its rear wheels rest in the pans 54, after which it is tied down by suitable mechanisms. The tractor truck will now be loaded with three automobiles one resting on wheel ramps 23, another on wheel ramps 31 and the third on wheel ramps 29 and 29a. When the load has been carried to its destination, the two automobiles carried by ramps 29 and 31 may be unloaded by the use of ramps 49 and 49a, after which the two pairs of ramps are raised to the dotted line position shown in Figure 3, whereupon the automobile resting on ramps 23 can be unloaded by moving it rearwardly over the fenders and down ramps 29.

Having described the invention, what is claimed as new is:

1. An automobile transporting truck, comprising, a wheel supported chassis frame, an elongated frame supported on the chassis, two spaced wheel supporting ramps pivoted at their front ends to the elongated frame, for tilting movement, side frames extending vertically from the elongated frame, transverse beams interconnecting the tops of the side frame near their front ends, spaced wheel ramps secured to said beams, a ramp pivotally attached to the rear end of each of the last mentioned ramps, a transverse beam interconnecting the ends of the last mentioned pivoted ramps, two ramps pivotally connected at their front ends to the last mentioned transverse beam, in vertical plane alignment with the last mentioned pivoted ramps, for movement into a horizontal position in which position they form extensions of the second mentioned pivoted ramps, means for turning the rearmost pivoted ramps from a downwardly ranging to a horizontal position and then simultaneously tilting the two upper pivoted ramp sections as a unit, about the forward pivot, and means for interconnecting the rearmost of the two upper pivoted ramp sections to the first mentioned pivoted ramp section, whereby, on further upward tilting movement of the upper pivoted ramp sections, the three pivoted sections will move as a unit.

2. An automobile transporting truck, comprising, a wheel supported chassis frame, an elongated frame supported on the chassis, two spaced wheel supporting ramps pivoted at their front ends to the elongated frame, for tilting movement, side frames extending vertically from the elongated frame, transverse beams interconnecting the tops of the side frame near their front ends, spaced wheel ramps secured to said beams, a ramp pivotally attached to the rear end of each of the last mentioned ramps, a transverse beam interconnecting the ends of the last mentioned pivoted ramps, two ramps pivotally connected to the last mentioned transverse beam, in vertical plane alignment with the pivoted ramps, to which the beam is connected for movement into a horizontal position in which position they form extensions of the second mentioned pivoted ramps, means comprising a winch attached to one of the side frames, for turning the rearmost of the upper pivoted ramps from a downwardly ranging to a horizontal position and then simultaneously tilting the two upper pivoted ramp sections as a unit, about the forward pivot and the lower ramps about their pivots.

3. An automobile transporting truck, comprising, a wheel supported chassis frame, an elongated frame supported on the chassis, two spaced wheel supporting ramps pivoted at their front ends to the elongated frame, for tilting movement, side frames extending vertically from the elongated frame, transverse beams interconnecting the tops of the side frame near their front ends, spaced wheel ramps secured to said beams, a ramp pivotally attached to the rear end of each of the last mentioned ramps, a transverse beam interconnecting the ends of the last mentioned pivoted ramps, two ramps pivotally connected to the last mentioned transverse beam, in vertical plane alignment with the pivoted ramps, for movement into a horizontal position in which they form extensions of said second mentioned pivoted ramps, means comprising a winch attached to one of the side members and a cable tension element operatively interconnecting the winch and the ramp section that is pivoted to the transverse bar, for moving the latter from a downwardly ranging to a horizontal position, and tension elements connecting the rearmost pivoted ramps with the free ends of the lowermost pivoted ramps, for simultaneously moving the upper two pivoted ramp sections and the lower pivoted ramps upwardly into a forwardly and downwardly inclined position.

4. An automobile transporting truck having a wheel supported chassis frame, means for supporting three automobiles comprising, an elongated frame supported from the chassis frame, two wheel ramps pivoted, at their front ends to the elongated frame, extending rearwardly towards the rear truck wheels, side frames extending vertically from the elongated frame, a plurality of transverse beams interconnecting the tops of the side frames near their front ends, two stationary wheel ramps secured to said beams, in spaced parallel relation, their rear ends terminating at the rearmost transverse beam, an assembly comprising, two spaced parallel wheel ramps, positioned to the rear of the stationary ramps, in alignment therewith, the front end of said ramp assembly being pivotally connected with the rearmost transverse beam, a beam interconnecting the rear ends of the ramp assembly, the ramp assembly and the beam being tiltable about the pivots, a second ramp assembly positioned to the rear of the upper tiltable ramp assembly and pivotally connected therewith at a point spaced from the ends of the said second ramp assembly, for movement from a downwardly and rearwardly inclined position to a substantially horizontal position in which the upper ends of the said second ramp assembly overlap the rear ends of the ramps of the first mentioned upper pivoted assembly, means for tilting the second mentioned upper ramp assemblies, means interconnecting the rearmost upper ramp assembly with the rear ends of the first mentioned pivoted ramps, whereby the further upward movement of the two upper pivoted ramp assemblies will impart a corresponding tilting movement to the ramp carried by the rectangular frame.

5. An automobile transporting truck having a wheel supported chassis frame, means for supporting three automobiles comprising, a frame supported from the chassis, two lower wheel ramps pivoted at their front ends to the frame, extending rearwardly towards the rear truck wheels, sides extending vertically from the frame, at least two transverse members interconnecting the tops of the sides, two stationary wheel ramps secured to the transverse members, in spaced parallel relation, an assembly comprising, two spaced parallel wheel ramps, positioned to the rear of the stationary ramps, in alignment therewith, the front end of the last named ramp assembly being pivotally connected with the rearmost transverse member, a bar interconnecting the rear ends of the said last mentioned ramp assembly, said ramp assembly and the bar being tiltable about the pivots, a second ramp assembly positioned to the rear of the first mentioned upper pivoted ramp assembly and pivotally connected therewith at a point spaced from the ends of the second upper pivoted ramp assembly, for movement from a downwardly and rearwardly inclined position to a substantially horizontal position in which the upper ends of the ramps of said second mentioned upper pivoted ramp assembly overlap the rear ends of the ramps of the first mentioned upper pivoted ramp assembly, means for moving said second mentioned upper pivoted ramp assembly upwardly into a horizontal position, and means interconnecting said second mentioned upper pivoted ramp assembly with the rear ends of the lower pivoted ramps, whereby the upward movement of the two upper pivoted ramp assemblies to a forwardly inclined position will impart a corresponding tilting movement to the lower pivoted ramps.

6. An automobile transporting truck having a chassis frame with spaced vertical sides, a pair of spaced automobile supporting ramps having their forward ends pivotally supported by the vertical sides, a second pair of ramps pivoted intermediate their ends to the rear end of the first mentioned ramps, the forward ends of the second mentioned ramps projecting above the first mentioned ramps and positioned to overlap them, a pair of spaced ramps positioned underneath the first mentioned ramps and pivotally connected with the chassis frame at their front ends, means for turning the second mentioned ramps about their pivotal connection with the first mentioned ramps into substantial alignment, and means interconnecting the ramps connected with the chassis frame and the second mentioned ramps for effecting a simultaneous movement of the upper and the lower ramps when the upper ramps are elevated.

EDWARD V. GARNETT.

REFERENCES CITED

The following references are of record in the file of this patent:

UNITED STATES PATENTS

| Number | Name | Date |
|---|---|---|
| 1,925,535 | Judd | Sept. 5, 1933 |
| 2,119,671 | Francis | June 7, 1938 |
| 2,385,115 | Stuart | Sept. 18, 1945 |